(12) United States Patent
McGoff et al.

(10) Patent No.: US 8,740,279 B1
(45) Date of Patent: Jun. 3, 2014

(54) MULTI-FUNCTIONAL TAILGATE FOR A VEHICLE

(71) Applicants: Danja McGoff, Washington Township, MI (US); David Anderson, Rochester, MI (US); Gary Bastian, Livonia, MI (US); Trevor C. Garvey, Algonac, MI (US); Eugene Paik, Troy, MI (US)

(72) Inventors: Danja McGoff, Washington Township, MI (US); David Anderson, Rochester, MI (US); Gary Bastian, Livonia, MI (US); Trevor C. Garvey, Algonac, MI (US); Eugene Paik, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/771,610

(22) Filed: Feb. 20, 2013

(51) Int. Cl.
| | |
|---|---|
| *B62D 33/027* | (2006.01) |
| *B62D 33/03* | (2006.01) |
| *B62D 33/033* | (2006.01) |

(52) U.S. Cl.
CPC .................................. *B62D 33/0273* (2013.01)
USPC .................. 296/51; 296/57.1; 49/168; 49/192

(58) Field of Classification Search
CPC ........ B60J 5/108; B60J 5/125; B62D 33/023; B62D 33/027; B62D 33/0273; B62D 33/03; B62D 33/033; B62D 33/037
USPC .................... 296/50, 51, 57.1, 52, 53, 55, 59; 49/168.192
See application file for complete search history.

(56) References Cited

U.S. PATENT DOCUMENTS

| | | | |
|---|---|---|---|
| 674,320 | A | 5/1901 | Sebring |
| 1,207,266 | A | 12/1916 | Bartholomew |
| 1,317,905 | A | 10/1919 | Baughman |
| 3,155,203 | A | 11/1964 | Kappen et al. |
| 3,567,274 | A | 3/1971 | Kaptur, Jr. et al. |
| 3,592,504 | A | 7/1971 | Sandor |
| 4,076,301 | A | 2/1978 | Gergoe |
| 5,641,262 | A | 6/1997 | Dunlop et al. |
| 5,673,960 | A | 10/1997 | Sorensen |
| 5,685,594 | A | 11/1997 | Harper |
| 5,711,569 | A | 1/1998 | Sovoda |
| 5,876,086 | A | 3/1999 | Lagrou et al. |
| 5,931,519 | A | 8/1999 | Jeffers et al. |
| 6,742,826 | B2 | 6/2004 | Humphrey et al. |
| 6,764,130 | B1 | 7/2004 | Hull |
| 6,779,825 | B1 | 8/2004 | Greenert et al. |
| 6,874,839 | B2 | 4/2005 | Acker et al. |

(Continued)

FOREIGN PATENT DOCUMENTS

| | | |
|---|---|---|
| CA | 2418606 | 8/2004 |
| JP | 2001152710 | 6/2001 |

*Primary Examiner* — Dennis H Pedder
(74) *Attorney, Agent, or Firm* — Ralph E Smith (57) ABSTRACT

A tailgate can include first and second frames, doors and sets of touchpads. The frames can be coupled to the vehicle to selectively pivot about a first axis, and can be selectively coupled to the vehicle via respective frame latches. The doors can be coupled to the respective frames to selectively pivot about a second axis perpendicular to the first axis and relative to the frames, and can be selectively coupled to the frames via respective door latches. The sets of touchpads can be operably connected with the respective doors and frame and door latches. Actuation of one or both sets of touchpads in different configurations can facilitate opening one or both of the doors independent of or with each other in a first configuration pivoting about the first axis with the respective frames, or in a second configuration pivoting about the second axis relative to the respective frames.

20 Claims, 12 Drawing Sheets

(56) References Cited

U.S. PATENT DOCUMENTS

| | | |
|---|---|---|
| 6,886,874 B2 | 5/2005 | Abe |
| 6,913,305 B1 | 7/2005 | Kern et al. |
| 6,932,420 B1 | 8/2005 | Donahue |
| 6,938,941 B2 | 9/2005 | Thiele et al. |
| 7,183,903 B2 | 2/2007 | Nicolson et al. |
| 7,273,991 B2 | 9/2007 | Korultay et al. |
| 7,375,299 B1 * | 5/2008 | Pudney ................ 200/61.62 |
| 7,380,873 B2 | 6/2008 | Shoemaker |
| 7,490,888 B2 | 2/2009 | Zagoroff |
| 7,699,373 B2 | 4/2010 | Miller |
| 7,832,790 B2 | 11/2010 | Plavetich |
| 8,061,753 B2 | 11/2011 | Papanikolaou et al. |
| 8,136,862 B2 | 3/2012 | Bator et al. |
| 8,246,098 B2 | 8/2012 | Cheung et al. |
| 2003/0015885 A1 | 1/2003 | Landwehr |
| 2003/0216817 A1 * | 11/2003 | Pudney ........................ 700/17 |
| 2009/0072583 A1 | 3/2009 | Elliott et al. |
| 2010/0007463 A1 * | 1/2010 | Dingman et al. ........... 340/5.72 |
| 2012/0061987 A1 | 3/2012 | Fraley et al. |
| 2012/0126564 A1 | 5/2012 | Hausler et al. |
| 2012/0324793 A1 | 12/2012 | Abbasi et al. |

* cited by examiner

FIG - 9C

MULTI-FUNCTIONAL TAILGATE FOR A VEHICLE

FIELD

The present disclosure relates generally to a multifunctional tailgate for a vehicle.

BACKGROUND

Vehicles often include an area or compartment, such as a cargo bed or trunk, where it is desirable to block the area at one time and in such a manner as to also provide access to the same area at another time. A closure member that is operably affixed to the vehicle, such as a door or gate, has been used to both block a vehicle compartment and later provide access to the compartment without having to completely separate the closure member from the vehicle. In some instances, it may be desirable to have a configuration of a closure member that provides for a portion of the closure member to be opened independent of another portion of the closure member. It may be further desirable to have a configuration of a closure member where at least a portion of the closure member can move in multiple directions to block off and allow access to the vehicle compartment.

SUMMARY

In one exemplary aspect, a tailgate for a vehicle is provided in accordance with the teachings of the present disclosure. The tailgate can include first and second frame members, first and second doors and first and second sets of touchpads. The first and second frame members can each be pivotably coupled to the vehicle and can be configured to selectively pivot about a first axis. The first and second frame members can be selectively coupled to the vehicle via respective first and second frame latches. The first and second doors can be pivotably coupled to the respective first and second frame members and can be configured to selectively pivot about a second axis perpendicular to the first axis and relative to the respective frame members. The first and second doors can be selectively coupled to the respective frame members via respective first and second door latches. The first and second sets of touchpads can be associated with the respective first and second doors and can be operably connected with the respective first and second frame and door latches. Actuation of one or both of the first and second sets of touchpads in various different configurations can facilitate opening one or both of the first and second doors independent of or with each other in a first configuration pivoting about the first axis with the respective frame members or in a second configuration pivoting about the second axis relative to the respective frame members between open and closed positions.

In another exemplary aspect, a tailgate for a vehicle is provided in accordance with the teachings of the present disclosure. The tailgate can include first and second L-frame members, first and second doors and first and second sets of touchpads. The first and second L-frame members can each be pivotably coupled to the vehicle and can be configured to selectively pivot about a first axis. The first and second L-frame members can be selectively coupled to the vehicle via respective first and second electro-mechanical frame latches. The first and second doors can be pivotably coupled to the respective first and second L-frame members and can be configured to selectively pivot about a second axis perpendicular to the first axis and relative to the respective L-frame members. The first and second doors can be selectively coupled to the respective L-frame members via respective first and second electro-mechanical door latches. The first and second sets of electrical touchpads can be associated with the respective first and second doors and operably connected with the respective first and second frame and door latches. Actuation of one or both of the first and second sets of touchpads in various different configurations can facilitate opening one or both of the first and second doors independent of or with each other in a first configuration pivoting about the first axis with the respective L-frame members or in a second configuration pivoting about the second axis relative to the respective L-frame members between open and closed positions.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
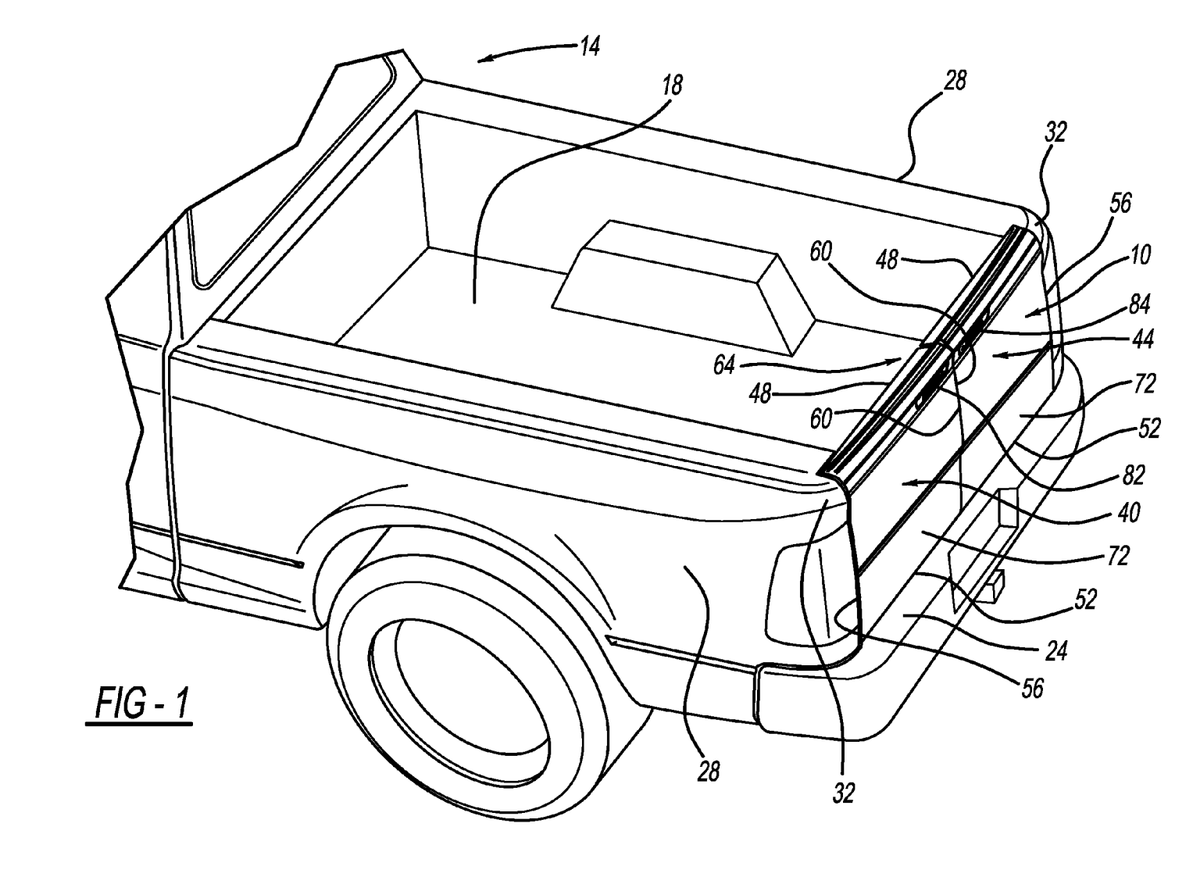
FIG. 1 is a partial perspective view of an exemplary multifunctional tailgate for an exemplary pick-up truck vehicle according to the principles of the present disclosure.

With initial reference to FIG. 1, an exemplary multifunctional tailgate 10 is shown in association with an exemplary vehicle 14 in accordance with the present teachings. In one exemplary configuration, the vehicle 14 is a pick-up truck and the multifunctional tailgate 10 can be coupled to the pick-up truck to allow access to and enclose a vehicle compartment, such as a cargo bed 18. While the discussion will continue with reference to vehicle 14 being a pick-up truck and the multifunctional tailgate 10 being coupled thereto, it should be appreciated that the tailgate 10 could also be utilized in various other vehicle configurations where a door or closure member is used to provide selective access to a cargo area, compartment or interior of a vehicle.

In one exemplary configuration, the multifunctional tailgate 10 can be positioned on pick-up truck 14 at a rearward end 24 of sidewalls 28 between D-pillars 32, as generally shown in FIG. 1. In this exemplary configuration, multifunctional tailgate 10 can be positioned in the same or substantially the same positions as a conventional tailgate. The multifunctional tailgate 10 can, however, include various operational configurations to provide selective access to or closure of the cargo bed 18. For example, multifunctional tailgate 10 can include two doors that can each independently open in multiple operational configurations, as will be discussed in greater detail below. Further, each door can include one or more touchpads that can provide for electronic control of the various operational configurations of each door, as will also be discussed below.

With additional reference to FIGS. 2-6, multifunctional tailgate 10 can include first and second doors 40, 44 in a 50/50 split configuration. It should be appreciated, however, that doors 40, 44 can be provided in various split configurations, such as 60/40, 65/35 or 70/30. Each door 40, 44 can include an upper end 48, an opposite lower end 52, an outer end 56 adjacent the D-pillars 32 and an opposite inner end 60. In the split configuration of multifunctional tailgate 10, inner ends 60 can be contiguous when tailgate 10 is in a closed configuration 64, as shown for example in FIG. 1. Doors 40, 44 can also include an inner side 68 configured to face a cab of the pick-up truck 14 when the doors 40, 44 are in the closed configuration 64, and an opposed outer side 72.

As will be discussed in greater detail below, doors 40, 44 can include a handle 82, 84 configured to provide for independent operation of each respective door 40, 44, as shown in FIG. 1. In one exemplary configuration, each handle 82, 84 can include respective touchpads 86, 90 (FIGS. 9B, 9C) that can, upon actuation in various different sequences, facilitate opening doors 40 and/or 44 in various different operational configurations. The touchpads 86, 90 will be discussed in greater detail below in connection with a discussion of the electronic operation of the doors 40, 44.

Figure 2:
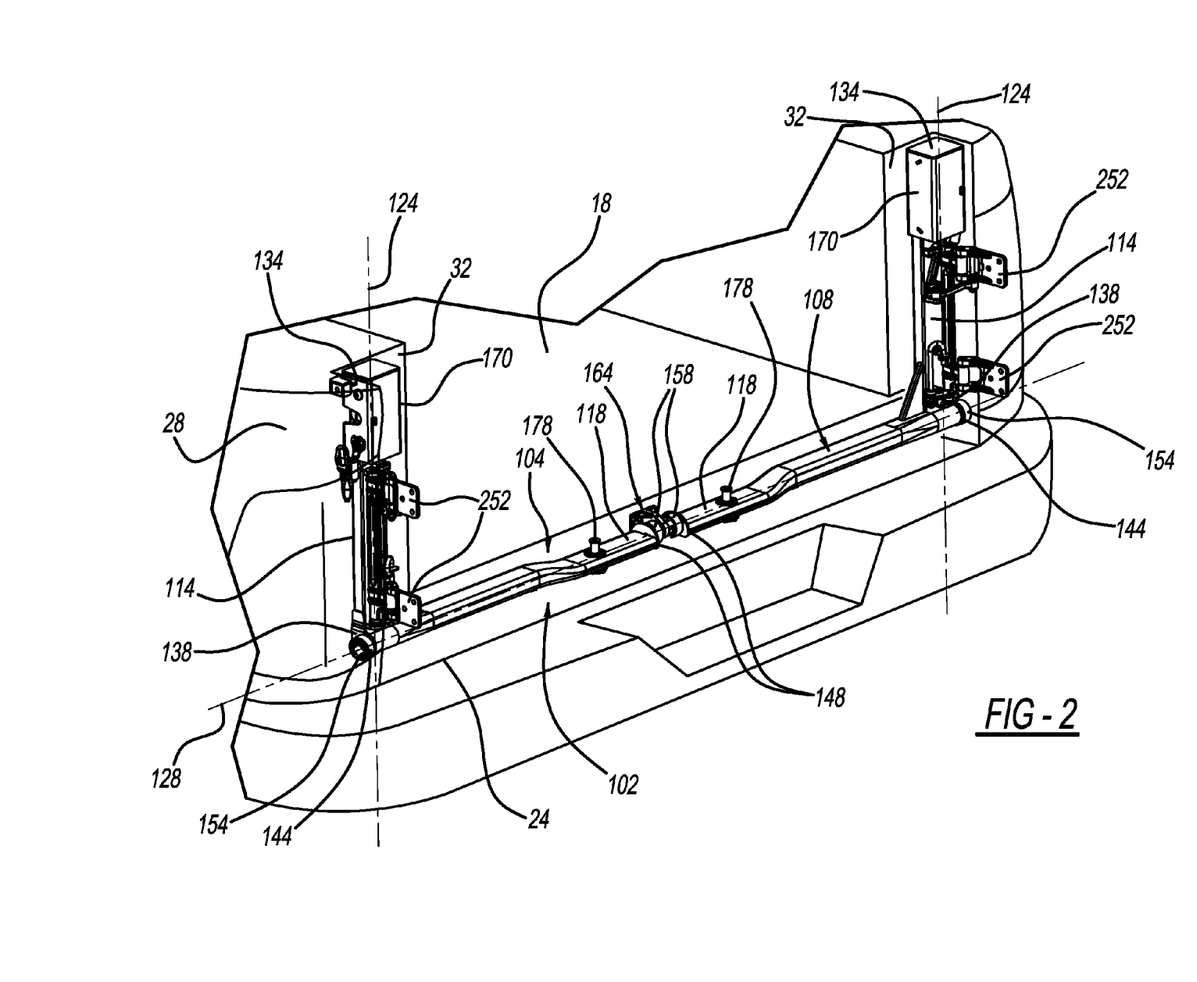
FIG. 2 is a perspective view of a pair of L-frame members operatively coupled to the vehicle with doors of the tailgate removed for clarity of illustration according to the principles of the present disclosure.

The doors 40, 44 can be operably coupled to a frame member assembly 102, as shown for example in FIG. 2 with reference to FIG. 1. Frame member assembly 102 can include first and second L-frames 104, 108 that are operably coupled to pick-up 14 and configured to move independently of and in unison with each other. The first and second L-frames 104, 108 can be coupled to respective doors 40, 44.

Figure 5:
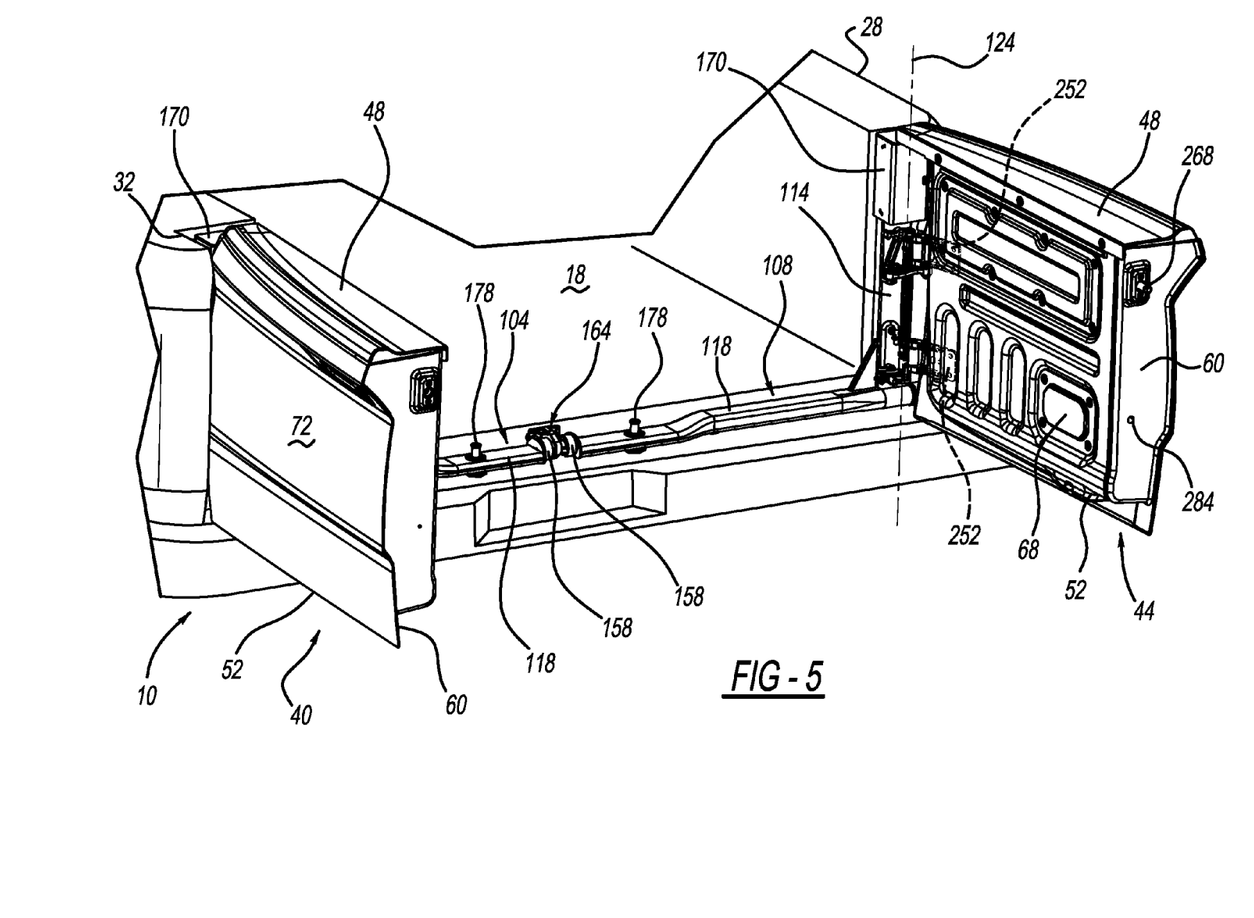
FIG. 5 is a perspective view of the multifunctional tailgate with both doors in the first operational mode according to the principles of the present disclosure.
Figure 6:
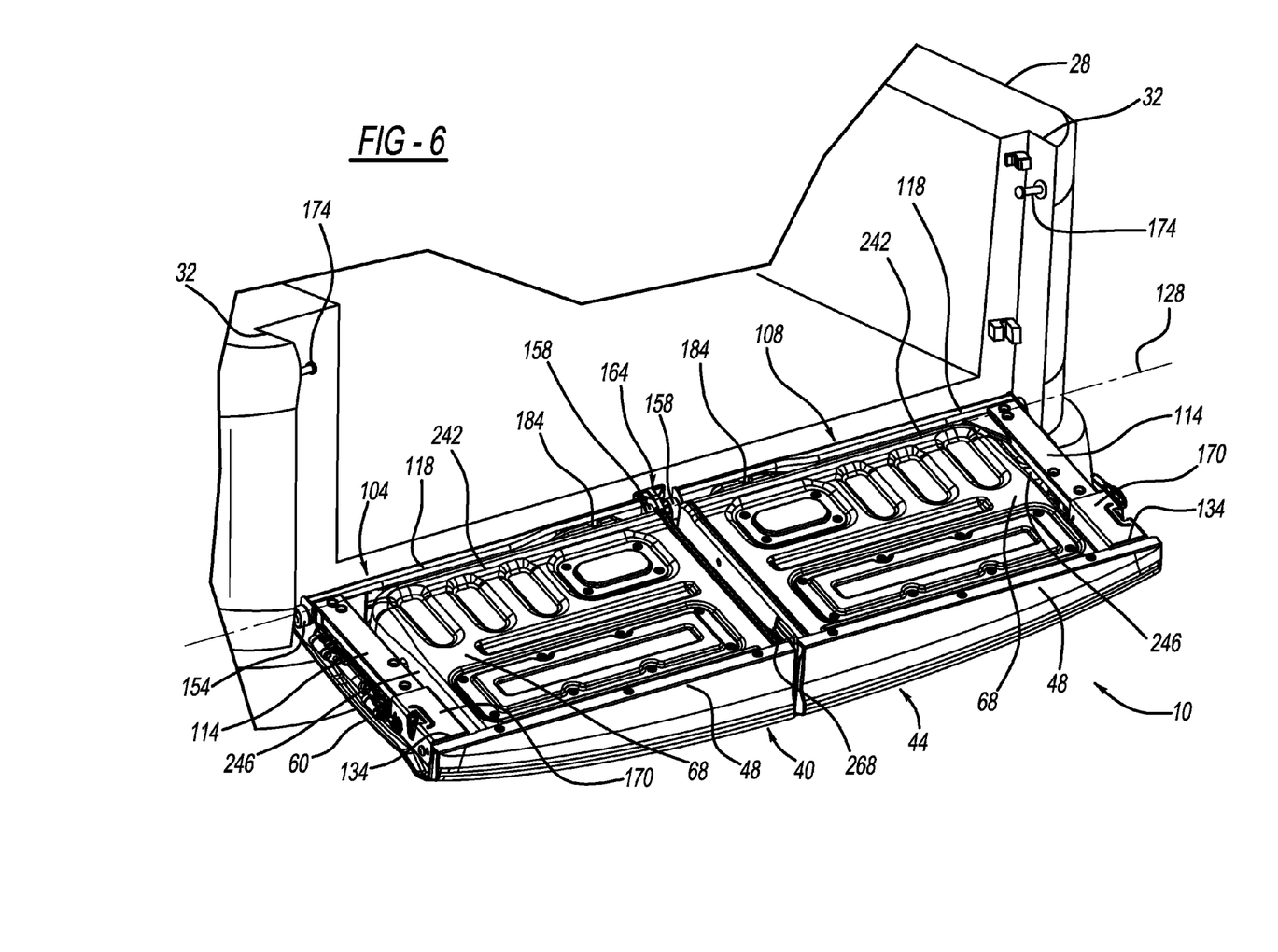
FIG. 6 is a perspective view of the multifunctional tailgate with both doors in the second operational mode according to the principles of the present disclosure.
Figure 7:
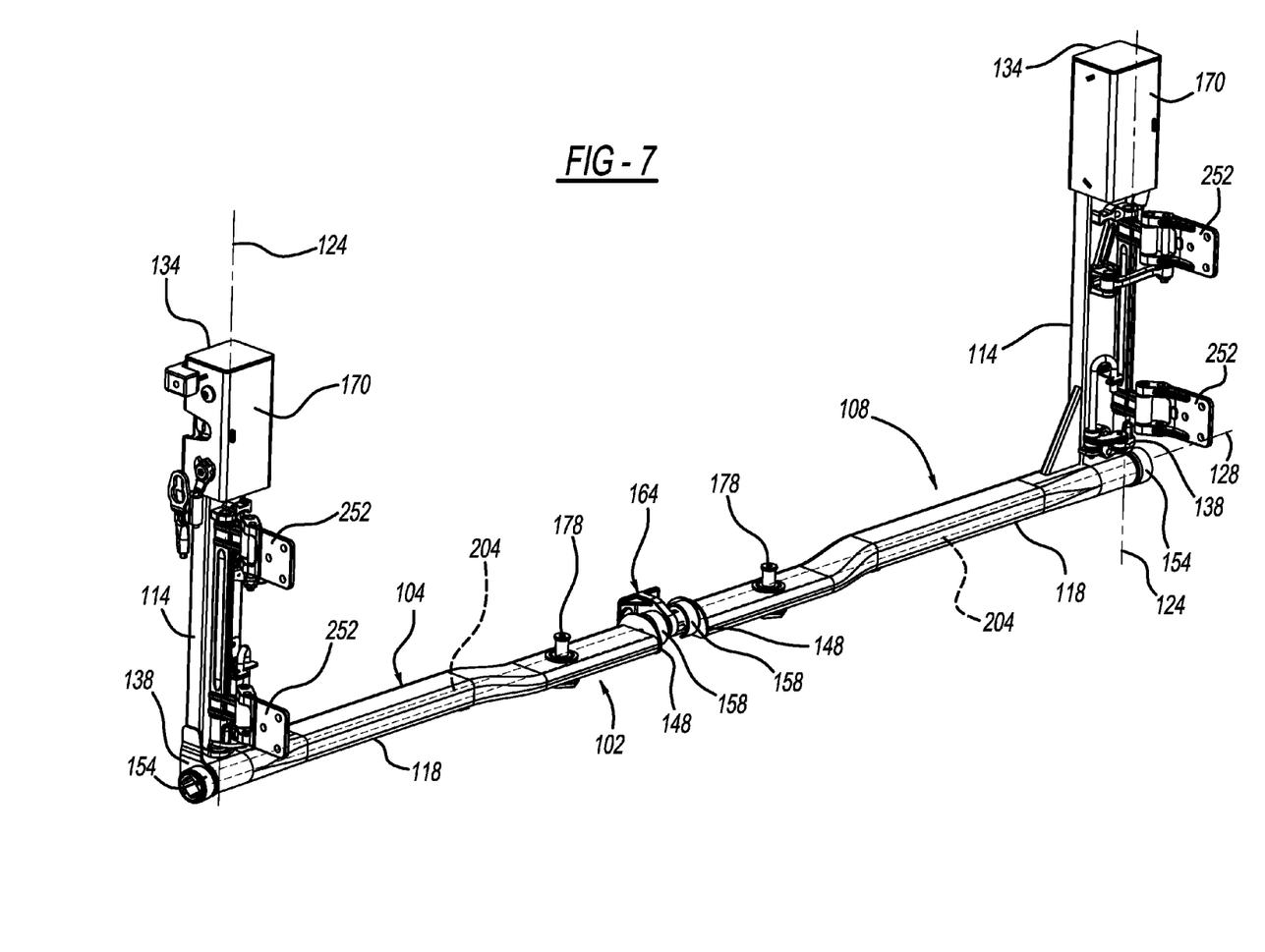
FIG. 7 is a perspective view of the L-frame members coupled to a central coupling according to the principles of the present disclosure.
Figure 8A:
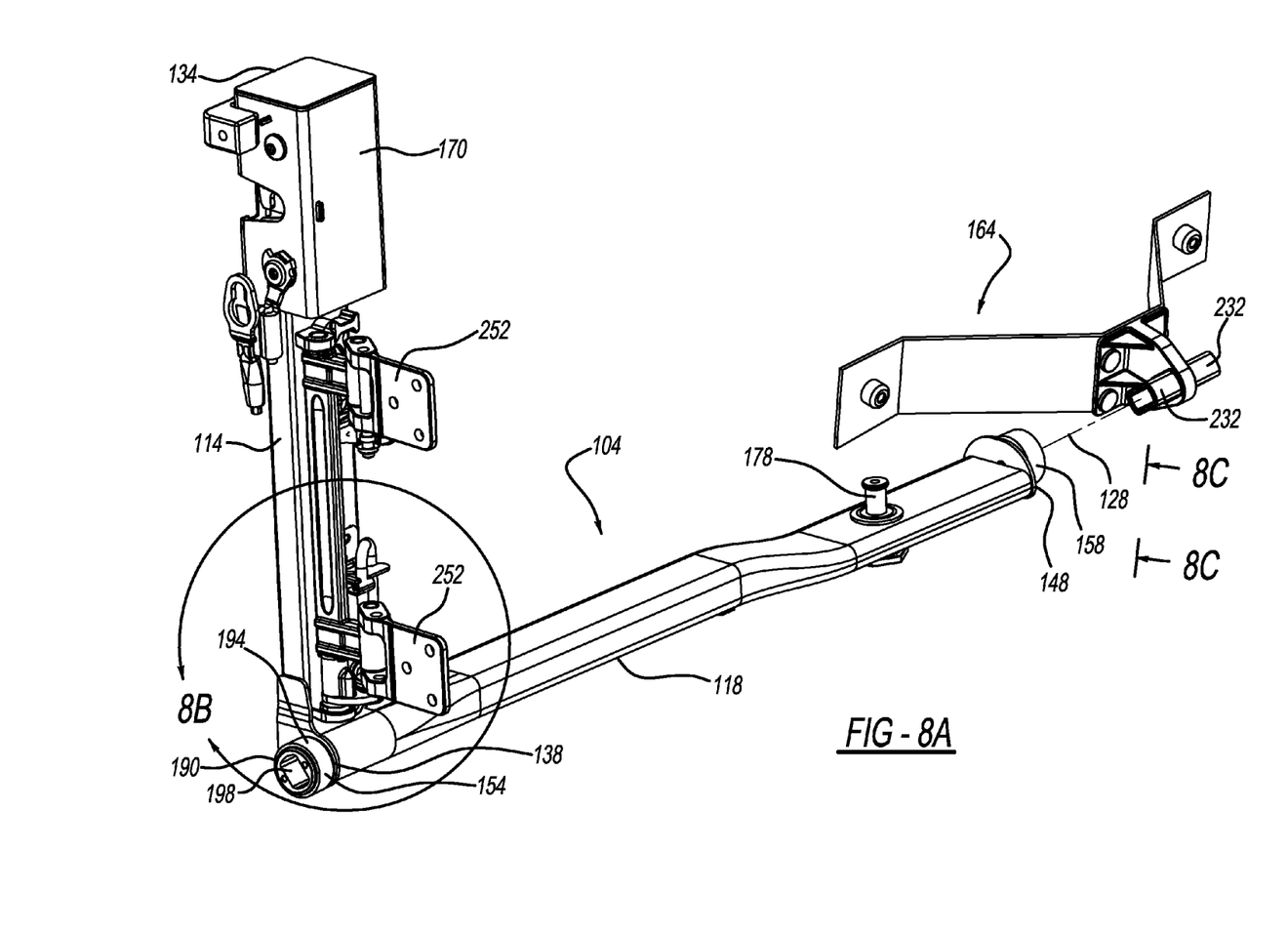
FIG. 8A is a partial exploded view of one of the L-frame members and the central coupling according to the principles of the present disclosure.
Figure 8B:
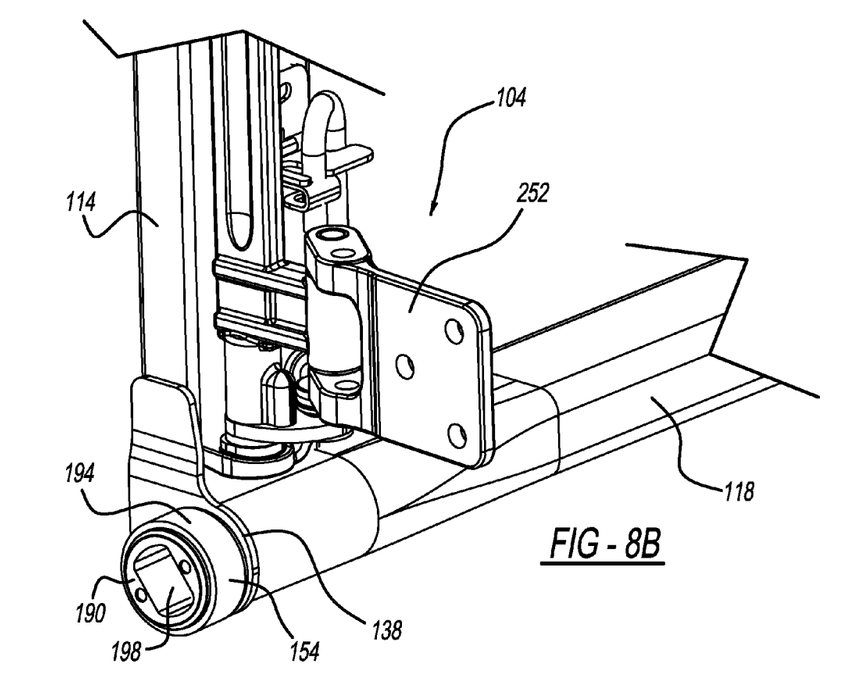
FIG. 8B is a partial view of the L-frame member of FIG. 8A along line 8B-8B according to the principles of the present disclosure.
Figure 8C:
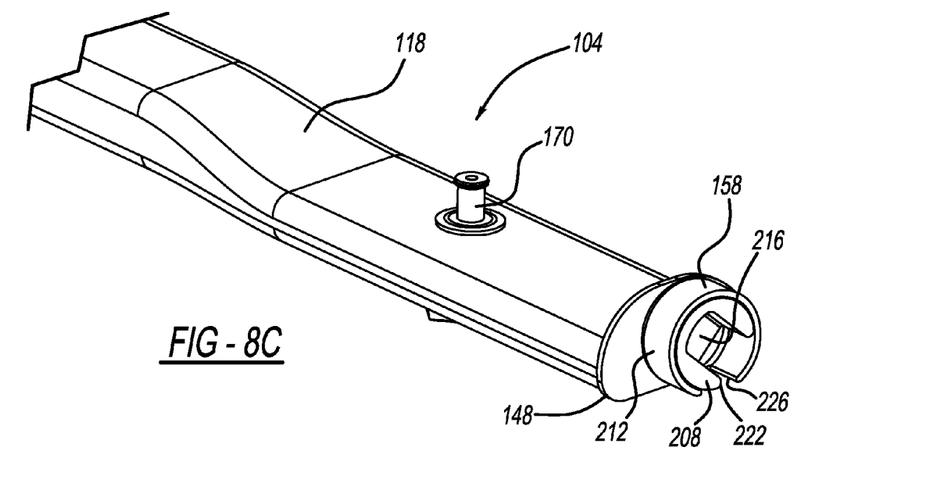
FIG. 8C is a partial view of the L-frame member of FIG. 8A along line 8C-8C according to the principles of the present disclosure.

With additional reference to FIGS. 7-8C, and continuing reference to FIGS. 1-6, each L-frame 104, 108 can include an upper member 114 and a lower member 118 extending perpendicular or substantially perpendicular therefrom, as shown in FIG. 7. It will be appreciated that while the discussion will continue with a focus on the first or driver side L-frame 104, the discussion is applicable to the second or passenger side L-frame 108, which can be the same or substantially the same as L-frame 104. The upper member 114 can define a vertical longitudinal axis 124 and the lower member 118 can define a horizontal longitudinal axis 128. In the exemplary configuration illustrated, upper member 114 can include an upper end 134 and an opposed lower end 138. Lower member 118 can include an outer end 144 forming or adjacent to the lower end 138 and an opposed inner end 148. It should be appreciated that the upper and lower members 114, 118 can be separate members coupled together in a known fashion, or can be integrally formed together as L-frames 104, 108.

With particular reference to FIGS. 2 and 7, the upper end 134 of each upper L-frame member 114 can include a first latch 170 configured to cooperate with a first latch pin or striker 174 joined to the vehicle structure, such as D-pillars 32. In one exemplary configuration, the first latches 170 are electro-mechanical latches in communication with touchpads 86, 90 as will be discussed in greater detail below. The lower L-frame members 118 can include a second striker 178 configured to cooperate with second latches 184 (FIGS. 6 and 9A), which in the exemplary configuration illustrated, can also be electro-mechanical latches in communication with touchpads 86, 90. The second electro-mechanical latches 184 can be positioned about the lower ends 52 of doors 40, 44 so as to selectively engage second strikers 178, as will also be discussed in greater detail below.

The lower/outer ends 138, 144 of L-frames 104, 108 can include an outer coupling 154 and the inner ends 148 can each include an inner coupling 158. The outer couplings 154 can be coupled to the respective D-pillars 32 and the inner couplings 158 can each be coupled to a respective side of a central coupling member 164. As will be discussed in greater detail below, the outer couplings 154 and inner couplings 158 together with the central coupling member 164 can facilitate independent rotation of each L-frame 104, 108 about the horizontal axis 128, as well as independent removal of each door 40, 44 from pick-up 14.

In the exemplary configuration illustrated in FIGS. 8A-8C with reference to FIG. 7, the outer coupling 154 can be in the form of a bushing 190 rotatably housed in an annular collar 194. Bushing 190 can include a female depression or recess 198 configured to be positioned over a correspondingly sized and shaped male pin or stud extending from D-pillar 32. In one exemplary configuration, bushing 190 can be removably positioned over the stud so as to facilitate selective removal of each door 40, 44. Bushing 190 can be coupled to or can be an integral part of a torsion rod assembly that includes a torsion rod 204 extending inside and secured to the L-frame 104.

Inner coupling 158 can include a C-shaped bushing 208 rotatably housed inside a C-shaped annular cup 212. Bushing 208 can include a female depression 216 forming an opening 222, as shown in FIG. 8C. To couple L-frame 104 to the central coupling member 164, the opening 222 of depression 216 can be aligned with an opening 226 in cup 212 to slide the bushing 208 and cup 212 over a male pin or stud 232 joined to coupling member 164. The inner coupling 158 can be coupled to the central coupling member 164 after the outer coupling 154 has been coupled to the D-pillar 32. Removal of the L-frames 104, 108 can be accomplished by reversing the process discussed above.

With particular reference to FIGS. 2-6, each of the doors 40, 44 can include a recess 242 extending along the lower end 52 and a recess 246 extending along the outer end 56. The recesses 242, 246 can be sized and shaped to receive the respective L-frames 104, 108 when doors 40, 44 are in the closed configuration and selective operating configurations, as will be discussed in greater detail below. The L-frames 104, 108 can be received in the recesses such that they are recessed or flush with the inner sides 68 of doors 40, 44, as shown for example in FIG. 6. In the exemplary configuration illustrated in FIG. 6, the recesses 246 can stop short of the upper end 48 of each door such that the L-frames 104, 108 are covered or hidden by the door structure when the doors 40, 44 are in the closed configuration 64, as shown for example in FIG. 6 with reference to FIG. 1.

Doors 40, 44 can be pivotably coupled to the respective upper members 114 via hinges 252, as shown in FIG. 2 with reference to FIG. 5. Doors 40, 44 can also be selectively coupled to the second strikers 178 via the second latches 184, as shown for example in FIG. 6 with reference to FIG. 2. As can be seen in FIG. 1 with reference to FIG. 2, the hinges 252 can be positioned such that they are hidden or not visible, such as from an external view, when doors 40, 44 are in the closed configuration 64.

Figure 9A:
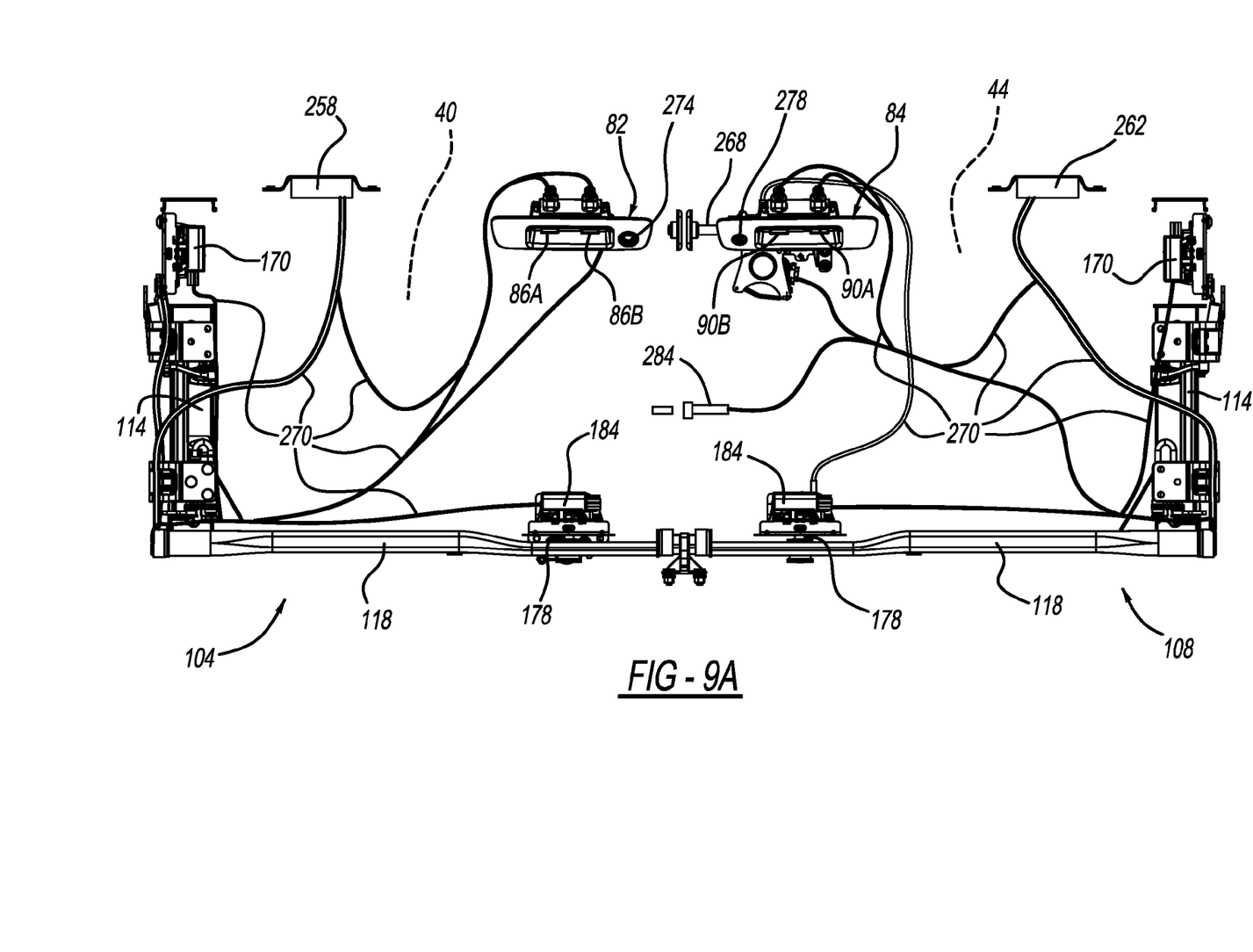
FIG. 9A is a partial view of the multifunctional tailgate with an outer structure of the doors removed for clarity of illustration according to the principles of the present disclosure.
Figure 9B:
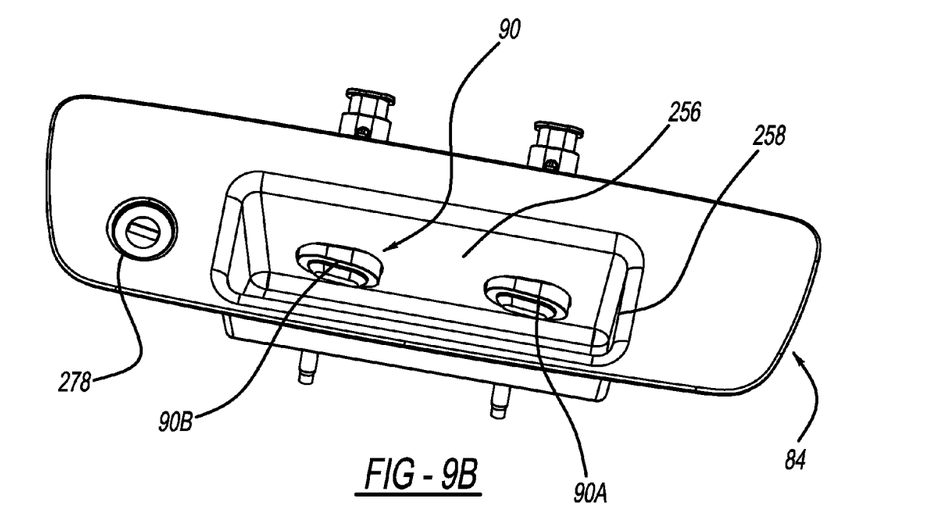
FIGS. 9B-9C are perspective views of handles associated with doors of the multifunctional tailgate according to the principles of the present disclosure.
Figure 9C:
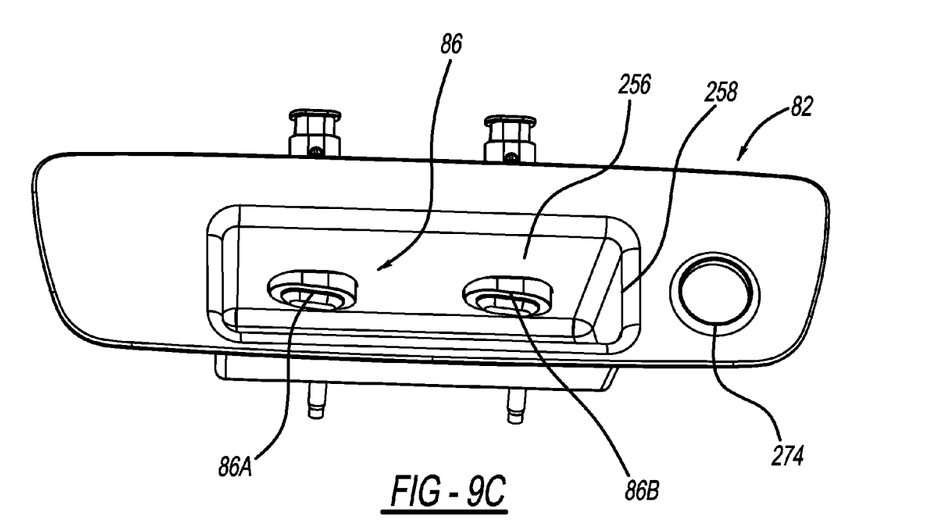

With particular reference to FIGS. 9A-9C, the handles 82, 84 and corresponding touchpads 86, 90 will now be discussed in greater detail. In the exemplary configuration illustrated, each of the handles 82, 84 can include a pair of respective touch pads 86A, 86B and 90A, 90B. In the exemplary configurations illustrated, the touchpads 86A, 86B and 90A, 90B can be electronic touchpads functioning in the form of an electronic switch. It should be appreciated, however, that while the discussion will continue with reference to touchpads 86, 90, various other mechanical or electro-mechanical actuation devices could be used to actuate electro-mechanical latches 170, 184, such as mechanical or electro-mechanical push-pins.

The handles 82, 84 and their associated touchpads 86, 90 can be electronically coupled to respective door electronic control modules 258, 262, which can be coupled to the electro-mechanical latches 170, 184 associated with the respective doors 40, 44, a center pin 268 and a vehicle control system (not specifically shown). The electronic control modules 258, 262 can also be in operable communication with each other. It should be appreciated that while the discussion will continue with reference to the two control modules 258, 262, the multifunctional tailgate 10 could alternatively use one control module associated with one of doors 40, 44 or utilize another vehicle control module (e.g., a body control module).

Center pin 268 can be controlled to selectively couple doors 40, 44 together. In the exemplary configuration illustrated, center pin 268 is associated with door 44 and can selectively engage door 40 to couple doors 40, 44 together. It should be appreciated, however, that center pin 268 could alternatively be associated with door 40. Door 44 can also include an optional proximity sensor 284 in communication with the control modules 258, 262 and configured to sense a proximity or presence of door 40 relative to door 44. It should be appreciated, however, that sensor 284 could alternatively be associated with door 40.

With specific reference to handle 82, touchpad 86A can be in communication with the second electro-mechanical latch 184 associated with door 40 and the center pin 268 via a wire or wires 270 or wireless communication, for example. Touchpad 86B can be in communication with the center pin 268 and the first electro-mechanical latch 170 associated with the upper member 114 of door 40. Handle 82 can also include a back-up camera 274, as shown for example in FIG. 9C. As for handle 84, touchpad 90A can be in communication with the second electro-mechanical latch 184 of door 44 and the center pin 268. Touchpad 90B can be in communication with the center pin 268 and the first electro-mechanical latch 170 associated with the upper member 114 of door 44. Handle 84 can also include a lock or key cylinder 278.

With continuing reference to FIGS. 9A-9C and reference back to FIGS. 3-6, operation of the multifunctional tailgate 10 will now be discussed in greater detail. As can be seen in FIGS. 3-6, each door 40, 44 can be independently opened to swing out about the vertical axis 124 or lower down about the horizontal axis 128. Additionally, the doors 40, 44 can each be opened to swing out (FIG. 5) in first operational configurations about their respective vertical axes 124 or each lower down in unison (FIG. 6) about the horizontal axis 128 in second operational configurations. The above operational configurations can be actuated by selective depression of one or more touchpads 86A, 86B, 90A, 90B in the exemplary manner discussed below.

Figure 3:
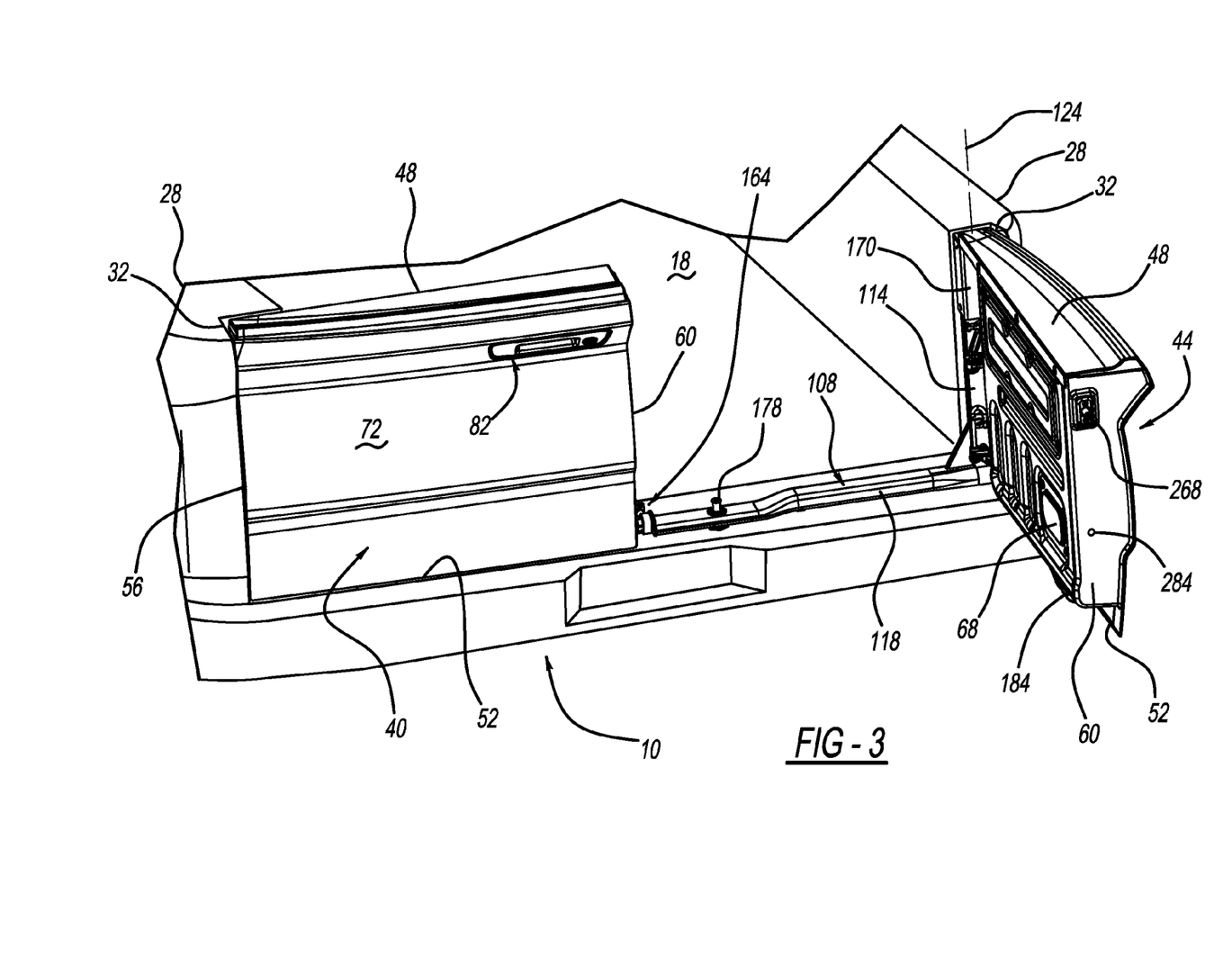
FIG. 3 is a perspective view of one of the doors in a first operational mode according to the principles of the present disclosure.

To open only the passenger side door 44 in the first operation configuration shown in FIG. 3, touchpad 90A can be actuated, such as by depressing, which can cause second electro-mechanical latch 184 to disengage from second striker 178 and center pin 268 to disengage from door 40. Door 44 can then be pivoted about vertical axis 124 relative to L-frame 108 via hinges 252 to an open position. In this first operation configuration, L-frame 108 does not move with door 44, as can be seen in FIG. 3.

Operation of only the driver side door 40 in the first operational configuration can be accomplished in a similar manner by actuating only touchpad 86A. In this scenario, actuating touchpad 86A can cause second electro-mechanical latch 184 to disengage from the second striker 178 of L-frame 104 and center pin 268 to disengage to allow door 40 to swing open via hinges 252 in a similar manner as door 44 shown in FIG. 3 and discussed above. Similar to door 44, L-frame 104 does not move in the first operation configuration of door 40.

Figure 4A:
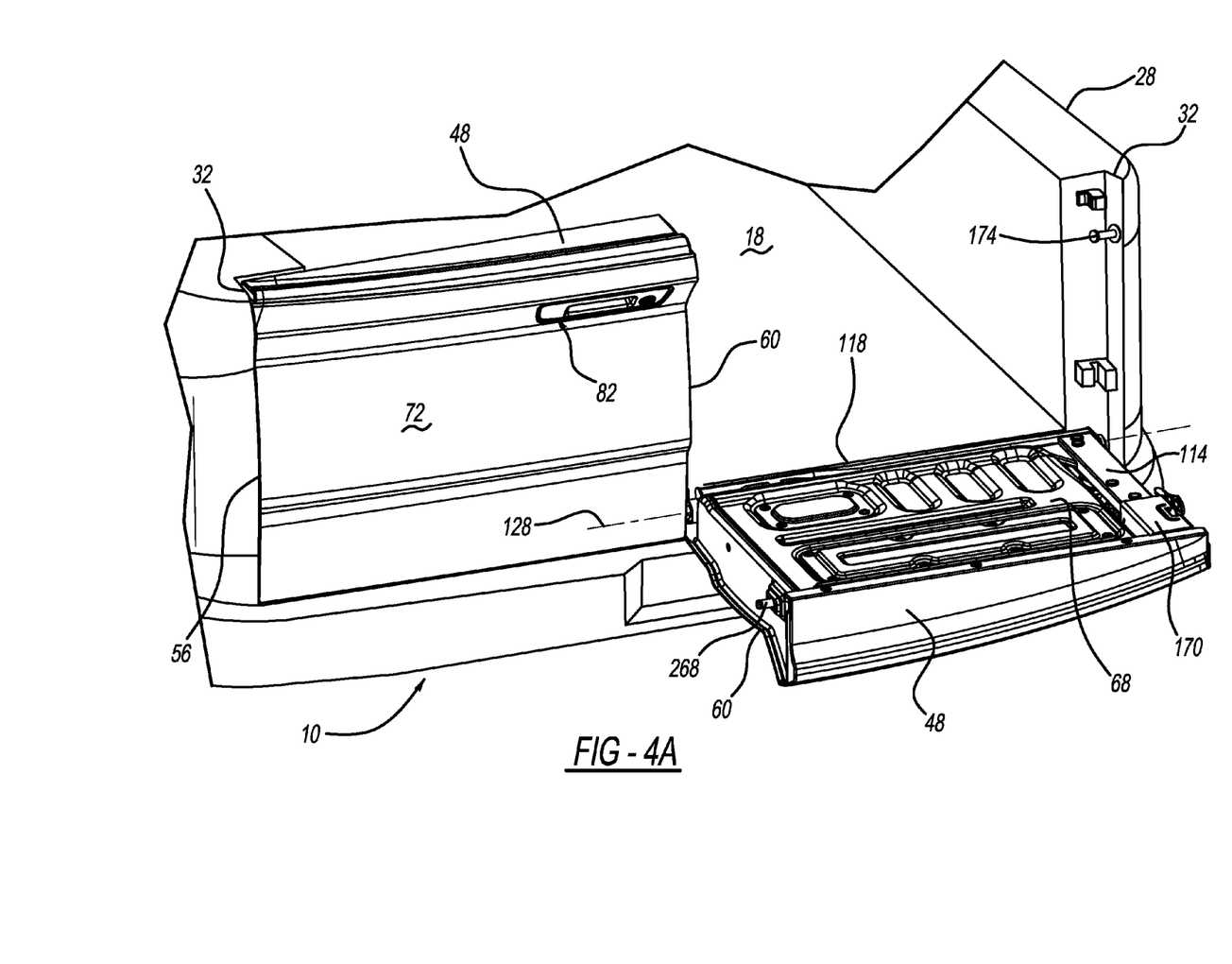
FIG. 4A is a perspective view of the door of FIG. 3 in a second operational mode according to the principles of the present disclosure.
Figure 4B:
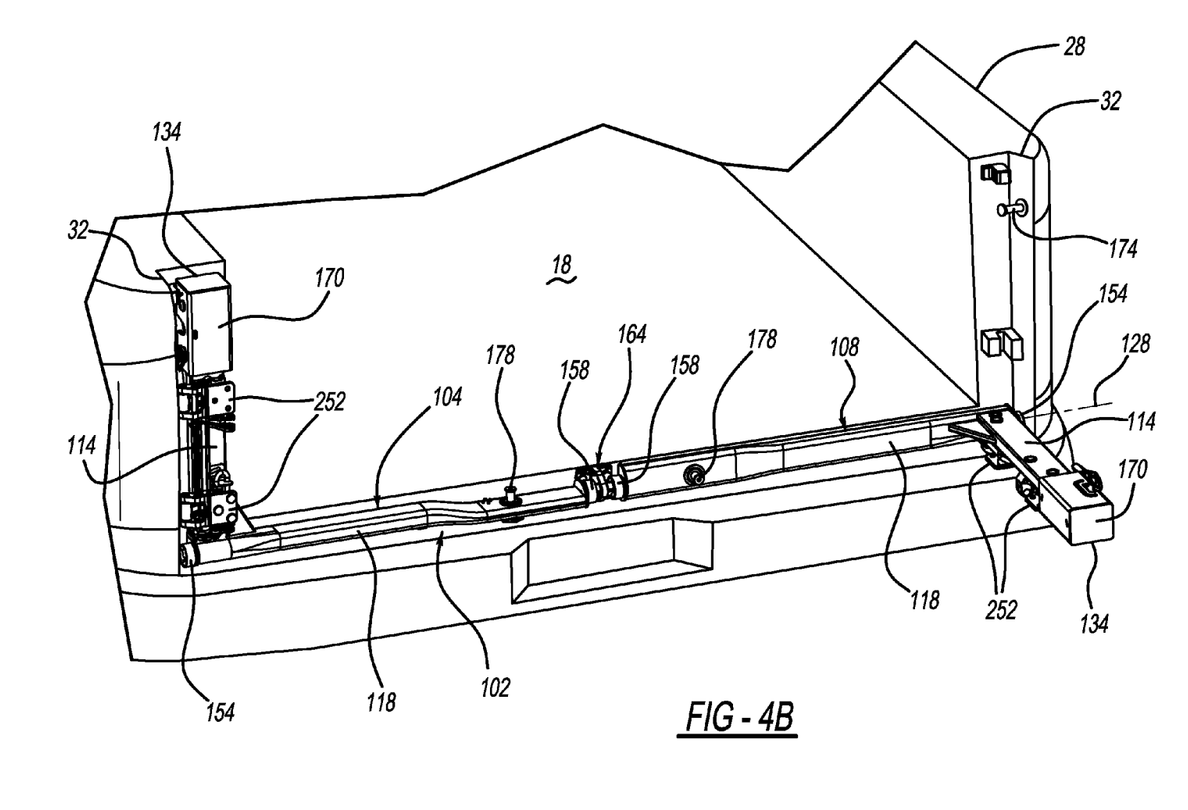
FIG. 4B is a perspective view of one of the L-frame members in the second operational mode with the associated door removed for clarity of illustration according to the principles of the present disclosure.

To open only the passenger side door 44 in the second operation configuration shown in FIG. 4A, touchpad 90B can be actuated to cause the first electro-mechanical latch 170 of L-frame 108 to release from first striker 174 and the center pin 268 to disengage from door 40. Door 44 can then be pivoted about horizontal axis 128 to lower to the horizontal open position shown in FIG. 4A. In this second operation configuration, L-frame 108 remains coupled to and moves with door 44 by rotating via couplings 154, 158. In particular, the second electro-mechanical latch 184 remains engaged to the second striker 178 of L-frame 108.

Operation of only the driver side door 40 in the second operational configuration can be accomplished in a similar manner by actuating only touchpad 86B. In this scenario, actuating touchpad 86B can cause first electro-mechanical latch 170 of L-frame 104 to disengage from the first striker 174 and the center pin 268 to disengage to allow door 40 to pivot open about horizontal axis 128 in a similar manner as door 44 shown in FIG. 4A and discussed above. Similar to L-frame 108 of door 44, L-frame 104 moves with door 40 in this second operational configuration.

In addition to each door 40, 44 being able to independently open in the above two operational configurations, the doors 40, 44 can be opened together or in unison in each of the first and second operational configurations. With particular reference to FIG. 5, each of the doors 40, 44 can be opened in the first operational configuration to pivot about the respective vertical axes 124 via hinges 252. To open both doors 40, 44 in this configuration, touchpads 86A, 90A, can be actuated to cause second electro-mechanical latches 184 to release from the respective second strikers of L-frames 104, 108. Actuation of the touchpads 86A, 90A also causes the center pin 268 to disengage from door 40. In this operational configuration, each of the L-frames 104, 108 do not move and remain engaged to the respective first strikers 174, as shown for example in FIG. 5.

With particular reference to FIG. 6, each of the doors 40, 44 can be opened in the second operational configuration in unison such that they each pivot about the horizontal axis 128. To open the doors in this operational configuration, touchpads 86B, 90B can be actuated to cause first electro-mechanical latches 170 to release from the respective first strikers 174. The actuation of touchpads 86B, 90B does not cause center pin 268 to disengage so that doors 40, 44 remain coupled to each other via the engaged pin 268 in this operational configuration. Similar to the discussion above directed to the second operational configurations of each individual door 40, 44, the L-frames 104, 108 move with the doors 40, 44 in this operational configuration. In particular, each L-frame 104, 108 remains engaged to the respective doors 40, 44 and pivots about couplings 154, 158 relative to the D-pillars 32 and the center coupling member 164.

It should be appreciated that the touchpads 86, 90 can be actuated in various other configurations to open doors 40, 44 in unison such that they pivot about the horizontal axis 128. For example, only one of touchpads 86B, 90B can be actuated with a particular pattern or sequence to open both doors 40, 44 in unison. In this exemplary configuration, one of touchpads 86B, 90B can be actuated (e.g., depressed) for an extended predetermined period of time to cause both first electro-mechanical latches 170 to release from the respective first strikers 174 while center pin remains engaged. As another example, one of touchpads 86B, 90B can be actuated by rapidly depressing the selected touchpad two or more times to cause both first electro-mechanical latches 170 to release from the respective first strikers 174 while center pin remains engaged. These configurations can provide an option to have one-handed operation of both doors 40, 44.

The doors 40, 44 can also each be opened in various different configurations through use of the separately pivotable L-frames 104, 108, together with the touchpads 86, 90 and the electro-mechanical latches 170, 184. For example, the driver side door 40 can be opened in the first operation configuration (pivoting about the vertical axis 124) by actuating touchpad 86A in the manner discussed above. While door 40 is opened in the first operation configuration, passenger door 44 can be opened in the second operational configuration (pivoting about the horizontal axis 128) by actuating touchpad 90B in the manner discussed above. In this scenario, L-frame 104 remains engaged to second striker 178 and does not move with door 40, while L-frame 108 rotates about horizontal axis 128 with door 44.

Similarly, driver side door 40 can alternatively be opened in the second operational configuration by actuating touchpad 86B, and, while door 40 remains opened, passenger side door 44 can be opened in the first operational configuration by actuating touchpad 90A. In this scenario, L-frame 104 rotates with door 40 about horizontal axis 128, while L-frame 108 remains engaged to strikers 174, 178 and does not move with door 44.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A tailgate for a vehicle, comprising:
   a first frame member and a second frame member each pivotably coupled to the vehicle and configured to selectively pivot about a first axis, the first and second frame members selectively coupled to the vehicle via respective first and second frame latches;
   a first door and a second door pivotably coupled to the respective first and second frame members and configured to selectively pivot about a second axis perpendicular to the first axis and relative to the respective frame members, the first and second doors selectively, coupled to the respective frame members via respective first and second door latches; and
   first and second sets of touchpads associated with the respective first and second doors and operably connected with the respective first and second frame and door latches;
   wherein actuation of one or both of the first and second sets of touchpads in various different configurations facilitates opening one or both of the first and second doors independent of or with each other in a first configuration pivoting about the first axis with the respective frame members or in a second configuration pivoting about the second axis relative to the respective frame members between open and closed positions.

2. The tailgate of claim 1, wherein actuation of the first set of touchpads in a first pad configuration facilitates opening only the first door in the first configuration while the second door is in one of the closed position or the open position in the first or second configurations.

3. The tailgate of claim 2, wherein actuation of the second set of touchpads in a second pad configuration facilitates opening only the second door in the second configuration while the first door is in one of the closed position or the open position in the first or second configurations.

4. The tailgate of claim 3, wherein the first and second frame members include first and second L-frames each pivotably coupled at an outer end to a side of an opening of the vehicle and at an opposed inner end to a central coupling member such that each of the L-frames with its respective door can selectively pivot about the first axis independent of the other L-frame.

5. The tailgate of claim 4, wherein each L-frame includes an upper leg and a lower leg, the lower legs being pivotably coupled to the central coupling member and each including a striker joined thereto, and wherein the first and second doors are hingably coupled to the upper legs of the respective L-frames and selectively engaged to the strikers via the respective door latches, the first and second doors configured to selectively pivot independent of each other about the second axis via the hingable couplings.

6. The tailgate of claim 5, wherein the first and second doors are hingably coupled to the respective upper legs via a first pair and a second pair of hinges, the first and second pairs of hinges being positioned relative to the doors and the upper legs such that they are covered by the doors and not visible from an external view of the vehicle when the doors are in the closed position.

7. The tailgate of claim 5, wherein each of the first and second doors is removably pivotably coupled to the vehicle via the lower legs such that each door is separately removable from the vehicle.

8. The tailgate of claim 4, wherein the first and second door latches and the first and second frame latches are electro-mechanical latches operably connected to the first and second sets of touchpads.

9. The tailgate of claim 8, further comprising a control module operably connected to the first and second sets of touchpads and the first and second door and frame latches.

10. The tailgate of claim 9, further comprising an electro-mechanical pin member associated with one of the first and second doors and operably connected to the control module and each set of touchpads, the pin member operable to selectively couple the first door to the second door.

11. The tailgate of claim 10, wherein the control module includes a first control module associated with the first door and operably connected to the first set of touch pads, first frame latch, pin member and the first door latch, and a second control module associated with the second door and operably connected to the second set of touchpads, second frame latch, pin member and the second door latch.

12. The tailgate of claim 11, further comprising first and second handles associated with the respective first and second doors;
wherein the first and second sets of touchpads are associated with the respective first and second handles.

13. The tailgate of claim 12, wherein each handle includes a recess having an upper wall and a lower wall, and wherein the first and second sets of touchpads are positioned on the upper walls.

14. The tailgate of claim 12, wherein the first set of touchpads includes a first inner and a first outer touchpad and wherein the second set of touchpads includes a second inner and a second outer touchpad, the first outer touchpad operably connected to the center pin and the first door latch, the first inner touchpad operably connected to the first frame latch and the center pin, the second inner touchpad operably connected to the second frame latch and the center pin, and the second outer touchpad operably connected to the center pin and the second door latch.

15. The tailgate of claim 14, wherein actuation of the first and second inner touchpads causes the center pin to be coupled to the first and second doors and the first and second frame latches to disengage thereby allowing the first and second doors to pivot about the first axis in unison.

16. The tailgate of claim 14, wherein actuation of the first and second outer touchpads causes the center pin to disengage from one of the first and second doors and the first and second door latches to disengage thereby allowing each of the doors to pivot about the second axis to the open position.

17. The tailgate of claim 14, wherein actuation of the first inner touchpad and second outer touchpad causes the center pin to disengage from one of the first and second doors and the first frame latch to disengage thereby allowing the first door to pivot with the first L-frame about the first axis to a substantially horizontal open position, and the second door latch to disengage from the second L-frame thereby allowing the second door to pivot about the second axis to a substantially vertical open position.

18. A tailgate for a vehicle, comprising:
a first L-frame member and a second L-frame member each pivotably coupled to the vehicle and configured to selectively pivot about a first axis, the first and second L-frame members selectively coupled to the vehicle via respective first and second electro-mechanical frame latches;
a first door and a second door pivotably coupled to the respective first and second L-frame members and configured to selectively pivot about a second axis perpendicular to the first axis and relative to the respective L-frame members, the first and second doors selectively coupled to the respective L-frame members via respective first and second electro-mechanical door latches; and
first and second sets of electrical touchpads associated with the respective first and second doors and operably connected with the respective first and second frame and door latches;
wherein actuation of one or both of the first and second sets of touchpads in various different configurations facilitates opening one or both of the first and second doors independent of or with each other in a first configuration pivoting about the first axis with the respective frame members or in a second configuration pivoting about the second axis relative to the respective frame members between open and closed positions.

19. The tailgate of claim 18, wherein actuation of the first set of touchpads in a first pad configuration facilitates opening only the first door in the first configuration while the second door is in one of the closed position or the open position in the first or second configurations, and wherein actuation of the second set of touchpads in a second pad configuration facilitates opening the only second door in the second configuration while the first door is in one of the closed position or the open position in the first or second configurations.

20. The tailgate of claim 19, wherein the first set of touchpads includes a first inner and a first outer touchpad and wherein the second set of touchpads includes a second inner and a second outer touchpad, the first outer touchpad operably connected to a center pin and the first door latch, the first inner touchpad operably connected to the first frame latch and the center pin, the second inner touchpad operably connected to the second frame latch and the center pin, the second outer touchpad operably connected to the center pin and the second door latch, the center pin operable to selective couple the first and second doors to each other.

* * * * *